United States Patent [19]

Yoshida et al.

[11] Patent Number: 5,323,618
[45] Date of Patent: Jun. 28, 1994

[54] HEAT STORAGE TYPE AIR CONDITIONING APPARATUS

[75] Inventors: Takeshi Yoshida; Hideaki Tagashira; Masami Imanishi; Hiroaki Hama; Moriya Miyamoto; Hiroshi Nakata; Osamu Morimoto, all of Wakayama, Japan

[73] Assignee: Mitsubishi Denki Kabushiki Kaisha, Tokyo, Japan

[21] Appl. No.: 18,398

[22] Filed: Feb. 17, 1993

[30] Foreign Application Priority Data

Mar. 19, 1992 [JP] Japan ................................. 4-63328
May 6, 1992 [JP] Japan ................................. 4-113703

[51] Int. Cl.⁵ .............................................. F25B 7/00
[52] U.S. Cl. .................................... 62/149; 62/174;
62/175; 62/196.3; 62/199; 62/201; 62/238.6;
62/430; 165/902
[58] Field of Search ................. 62/201, 175, 430, 437,
62/238.6, 238.7, 335, 149, 174, 175, 197, 199,
200, 196.3, 510; 165/902, 10, 10 A

[56] References Cited

U.S. PATENT DOCUMENTS 4,149,389  4/1979  Hayes et al. ................. 62/335 X
4,608,836  9/1986  MacCracken et al. ........... 62/430 X

FOREIGN PATENT DOCUMENTS 0233573  2/1990  Japan .

Primary Examiner—Harry B. Tanner
Attorney, Agent, or Firm—Oblon, Spivak, McClelland, Maier & Neustadt

[57] ABSTRACT

A heat storage type air conditioning system capable of performing refrigerant receiving and discharging control and oil quantity control, which, in operating the general cooling circuit and the cold radiating circuit simultaneously or separately, is free from difficulties that the compressor is damaged or the cooling capacity is lowered when the quantities of refrigerant in those circuits are excessively increased or decreased, and is able to continue the operations with the quantity of refrigerant and the quantity of ice machine oil adjusted to suitable values. In the heat storage type air conditioning system, evaporators are provided in a general cooling circuit driven by a compressor and in a cold radiating circuit driven by a refrigerant gas pump, respectively, so that those circuits operate independently of each other. Furthermore, bypass circuits are provided to allow refrigerant to flow between liquid pipes and between gas pipes in those circuits. In a cold storing operation, the bypass circuits are closed, so that a cold storing circuit is formed by the compressor, a condenser, a first pressure reducing mechanism, and a cold storing heat exchanger.

9 Claims, 8 Drawing Sheets

--- REFRIGERANT FLOW DURING COLD STORING OPERATION

FIG. 3

REFRIGERANT FLOW DURING GENERAL COOLING OPERATION
REFRIGERANT FLOW DURING COLD RADIATING OPERATION

— REFRIGERANT FLOW DURING GENERAL COOLING AND COLD RADIATING OPERATIONS
--- REFRIGERANT FLOW DURING COLD STORING OPERATION

FIG. 12A
⟨CASE OF PEAK LOAD⟩

FIG. 12B
⟨CASE OF LOW LOAD⟩

← REFRIGERANT FLOW DURING GENERAL COOLING OPERATION
←-- REFRIGERANT FLOW DURING COLD RADIATING OPERATION

HEAT STORAGE TYPE AIR CONDITIONING APPARATUS

BACKGROUND OF THE INVENTION

1. Field of the Invention

This invention relates to reduction and standardization of electric power consumption during daytime, and more particularly to a heat storage type air conditioning system with a heat storage tank containing a heat storage medium.

2. Description of the Prior Art

Figure 16:
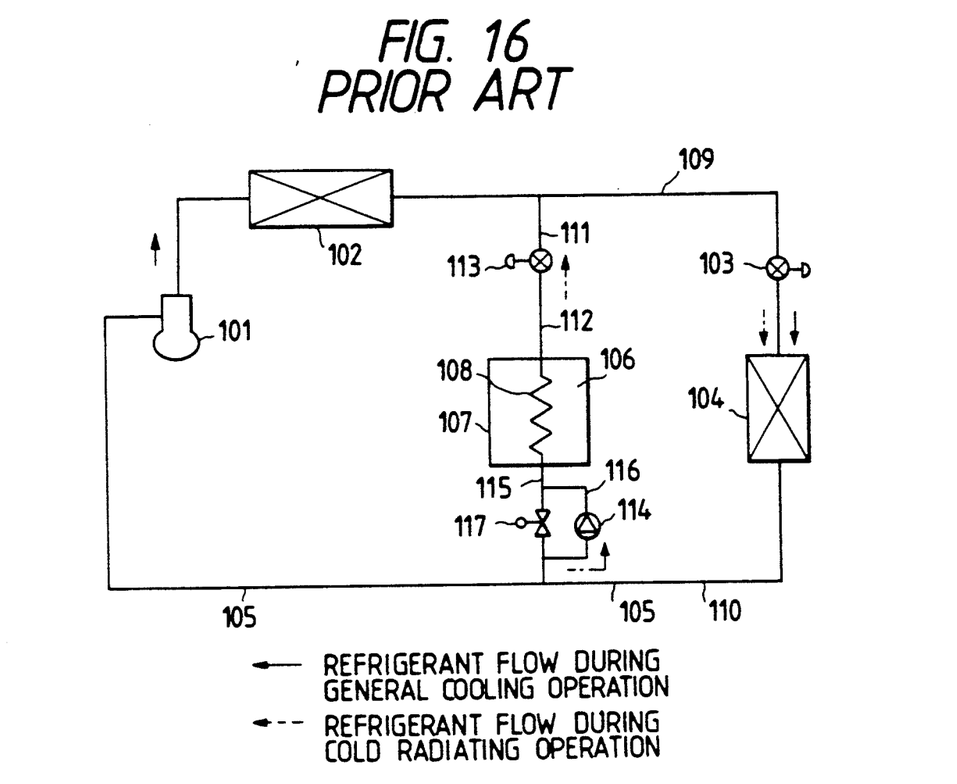
FIG. 16 is a piping diagram showing the arrangement of a conventional heat storage type air conditioning system.

FIG. 16 is an explanatory diagram showing the arrangement of a conventional heat storage type air conditioning system disclosed, for instance, by Unexamined Japanese Patent Publication (Kokai) Hei-2-33573/(1990). The system comprises: a main refrigerant circuit 105 including a compressor 101, a condenser 102, a first pressure reducing mechanism 103, and an evaporator 104 which are connected in the stated order; a heat storing tank 107 containing a heat storing medium 106; a cold (low temperature) storing heat exchanger 108 for performing heat exchange between the heat storing medium 106 in the heat storing tank 107 and the refrigerant; a first bypass circuit 111 for allowing refrigerant to flow between a gas line 110 and a liquid line 109 extended between the condenser 102 and the pressure reducing mechanism 103 through the aforementioned heat exchanger 108; a second pressure reducing mechanism 113 connected to a liquid pipe 112 of the first bypass circuit 111; a refrigerant gas pump 114 for allowing heat exchange between the heat storage medium in the heat storage tank 107 and the refrigerant; a second bypass circuit 116 including the refrigerant gas pump 114 in such a manner that input and output terminals of the latter 114 are connected to a gas pipe 115 of the first bypass circuit 111; and a valve unit 117 for controlling the flow of refrigerant to the second bypass circuit 116.

Now, the operation of the conventional heat storage type air conditioning system thus organized will be described. The above-described circuit elements 101 through 104 are so connected that refrigerant flows to them through the refrigerant pipe line. In the main refrigerant circuit 105, the condenser 102 obtains cold (low temperature) through heat exchange with the air outside the room (hereinafter referred to as "outside air", when applicable), and the cold thus provided is applied to the air inside the room (hereinafter referred to as "inside air", when applicable) through the evaporator 104.

On the other hand, the system includes the heat storing o tank 107 containing the heat storing medium 106 which is able to store heat. The heat storing tank 107 incorporates the heat storing heat exchanger 108 adapted to perform heat exchange between the refrigerant and the heat storing medium 106 in the heat storing tank 107.

In an ordinary cooling operation, the second pressure reducing mechanism 113 is held closed, so that the refrigerant circulates in the main refrigerant circuit 105 only. That is, the refrigerant gas discharged from the compressor 101 is condensed by the condenser 102, and subjected to adiabatic expansion by the first pressure reducing mechanism 103, so that it is formed into a two-phase, gas and liquid, fluid at low temperature. The two-phase fluid flows into the evaporator 104, where it receive heat from outside; that is, it cools the surrounding air. The two-phase fluid itself evaporates, thus returning to the compressor 101. Hereinafter, the above-described operation will referred to as "a general cooling operation" when applicable, and a refrigerant flow circuit in the general cooling operation will be referred to as "a general cooling circuit" when applicable.

In a cold storing operation in which cold is stored in the heat storing tank 107 during nighttime in which electric power load is low, the first pressure reducing mechanism 103 is held closed. That is, the refrigerant gas discharged from the compressor 101 is condensed by the condenser 102, so that it is converted into a refrigerant at high temperature and at high pressure. The refrigerant flows into the first bypass circuit 111, and it is subjected to adiabatic expansion by the second pressure reducing mechanism 113, and then allowed to evaporate at the heat exchanger 108, thus cooling the heat storing medium 106 in the heat storing tank 107, so that cold is stored therein. Thereafter, the refrigerant itself evaporates, thus returning through the valve unit 117 to the compressor 101. Hereinafter, the above-described operation will be referred to as "a cold storing operation", when applicable, and a refrigerant flow circuit in the cold storing operation will be referred to as "a cold storing circuit", when applicable.

The system may perform a stored heat recovering operation in which cold stored in the heat storing tank 107 during nighttime is utilized. That is, when the refrigerant gas pump 114 is operated with the compressor 101 held stopped, a gas refrigerant at low temperature and at low pressure is increased in pressure by the refrigerant gas pump 114, and allowed to flow into the heat exchanger 108, thus giving heat to the heat storing medium 106. The refrigerant itself is condensed into a liquid. The liquid is subjected to adiabatic expansion by the second pressure reducing mechanism 113, so that it is converted into a two-phase, gas and liquid, fluid. The two-phase fluid flows into the evaporator 104, where it receives heat from outside, thus cooling the surrounding air. The fluid itself is allowed to evaporate; that is, it is gasified, thus returning to the refrigerant gas pump 114. Hereinafter, the above-described operation will be referred to as "a cold radiating operation", when applicable, and a circuit in which refrigerant flows in the cold radiation operation will be referred to as "a cold radiating circuit", when applicable.

The above-described air conditioning system is able to perform the general cooling operation, and the cold radiating operation in a parallel mode. That is, the system may be operated with both the compressor 101 and the refrigerant gas pump 114 in operation. More specifically, while the refrigerant condensed in the main refrigerant circuit 105 is allowed to evaporate by the evaporator 104, the refrigerant condensed by the heat exchanger 108 in the first bypass circuit 111 meets the refrigerant of the main refrigerant circuit 105, so that both the refrigerants are allowed to evaporate by the evaporator 104.

In the cooling operation, the ratio of the flow rate of the condensed refrigerant in the main refrigerant circuit to that of the condensed refrigerant in the bypass circuit is adjusted by controlling the operating capacity of the compressor 101 and the speed of rotation of the refrigerant gas pump 114, thus dealing with the air cooling load to the room.

Hence, when the general cooling operation and the cold radiating operation are performed in a parallel mode so that the stored cold is used for the cooling operation as much as required, electric power required for operation of the compressor 101 is standardized, reducing its maximum value.

The cold storing operation is carried out during the cold storing time period (ten to fourteen hours) in the night of the day the cooling operation has been carried out, and it may be performed with the residual ice left as it is, or it may be performed after the residual ice is molten.

The operation of the compressor 101 and the refrigerant gas pump in a parallel mode; that is, to perform the general cooling operation and the cold radiation operation in a parallel mode contributes effectively to a reduction of the load on the request for power consumption during daytime. However, the above-described method in which the refrigerants condensed by the condenser 102 and the heat exchanger 108 are allowed to meet each other, and are then allowed to evaporate by one and the same evaporator 104, suffers from the following difficulties: Depending on variations in environmental conditions such as inside air temperature and outside air temperature, and variations in the load on the side of the heat exchanger due to variation in temperature of the heat storing medium, the general cooling operation and the cold radiation operation become unbalanced in the quantity of refrigerant or in the quantity of ice machine oil. As a result, the operating conditions are adversely affected, so that the system is lowered in capacity. In addition, in each circuit, pressure rise or liquid back may take places when the quantity of refrigerant is abnormally increased or decreased, or the bearing of the compressor may be seized as a result of the shortage of ice machine oil; that is, there are unwanted conditions which may directly damage the refrigerant circuit parts.

In order to eliminate the above-described difficulties, the following method may be taken into consideration: In the method, the amounts of operation of the compressor and the refrigerant gas pump are controlled, so that the condensed refrigerant in the general cooling operation and the condensed refrigerant in the cold radiation operation are adjusted in flow rate. However, the method is not so effective as expected, because of the following reasons: The control method is rather intricate, and therefore the control equipment is high in cost, and it is required to increase the number of transmission lines of the control circuit. Furthermore, it is essential to add a mechanism (such as an invertor) for adjusting the capacity of the compressor or the refrigerant gas pump. That is, employment of the method results in an increase in running cost.

The cold storing operation, the general cooling operation, and the cold radiating operation are different in the required quantity of refrigerant from one another; that is, both the general cooling operation and the cold storing operation are less in the necessary quantity of refrigerant, whereas the quantity of refrigerant required for the cold radiating operation is relatively large. Hence, during the cold storing operation, a larger part of the quantity of refrigerant sealed in the whole circuit is surplus. When the cold radiating operation is carried out, or when the cold radiating operation is performed in combination with the general cooling operation, a large quantity of refrigerant is required. Hence, in those operation modes, it is necessary for the system to have means for temporarily receiving and discharging the refrigerant. However, the conventional air conditioning system has no means for controlling the quantity of refrigerant in the above-described manner. Thus, in a view point of controlling the quantity of refrigerant, it is rather difficult to put the conventional system in practical use.

The conventional heat storage type air conditioning system is designed as described above. Hence, the system is disadvantageous in the following points: In operation of the general cooling circuit and the cold radiating circuit in a parallel mode, the refrigerants excessively cooled and reduced in pressure in those circuits meet each other at the evaporator. Hence, the circuits are varied (become unbalanced) in the quantity of refrigerant and in the quantity of ice machine oil depending on variations in the environmental conditions or variations in the load on the side of the heat storing heat exchanger, which may make it difficult to continue the operations of the circuits.

Since the operating modes are different from one another in the required quantity of refrigerant, the quantity of refrigerant is changed for every operating mode; however, the system has no means for controlling the variations in the quantity of refrigerant. Hence, the operation of the system is not smooth, particularly in the cold storing operation. Thus, it is rather difficult to put the system in practical use.

In the case where, in the cooling operation, both the general cooling circuit and the cold radiating circuit are operated at the same time, the former circuit is operated with priority. Therefore, the degree of dependence on the cooling operation using the stored cold is not more than 50% of the total cooling load.

The conventional heat storage type air conditioning system is designed as described above. Hence, when the cold storing operation is carried out according to an "ice on coil" system, the cold storing heat exchanger may be broken by growth of the residual ice. This difficulty may be eliminated by melting the residual ice before the cold storing operation. However, melting the residual ice in this way is against the economization of energy, being disadvantageous in that electric power is used for melting it at night, and the cold (low temperature) of the residual ice cannot be utilized for the cooling operation during daytime.

SUMMARY OF THE INVENTION

Accordingly, an object of this invention is to eliminate the above-described difficulties accompanying a conventional heat storage type air conditioning system. More specifically, an object of the invention is to provide a heat storage type air conditioning system capable of performing refrigerant receiving and discharging control and oil quantity control, which, in operating the general cooling circuit and the cold radiating circuit simultaneously or separately, is free from difficulties that the compressor is damaged or the cooling capacity is lowered when the quantities of refrigerant in those circuits are excessively increased or decreased, and is able to continue the operations with the quantity of refrigerant and the quantity of ice machine oil adjusted to suitable values.

Furthermore, another object of this invention is to provide a heat storage type air conditioning system in which, the degree of dependence on the stored cold of the cooling operation is at least 50% of the total cooling load, and which is free from difficulties that the cold storing heat exchanger is damaged by growth of the residual ice in the cold storing operation, and the ice is molten in the cold storing time zone.

In order to achieve the foregoing object, in a heat storage type air conditioning system of the invention, evaporators are provided in a general cooling circuit driven by a compressor and in a cold radiating circuit driven by a refrigerant gas pump, respectively, so that those circuits operate independently of each other. Furthermore, bypass circuits are provided to allow refrigerant to flow between liquid pipes and between gas pipes in those circuits. In a cold storing operation, the bypass circuits are closed, so that a cold storing circuit is formed by the compressor, a condenser, a first pressure reducing mechanism, and a cold storing heat exchanger.

The system further comprises: a third bypass circuit for bypassing the second pressure reducing mechanism with the aid of a check valve; a fourth bypass circuit for bypassing with the aid of a valve unit the refrigerant gas pump connected to the second gas pipe in the cold radiating circuit; and valve units connected to the refrigerant inlets of the first and second evaporators, respectively, the cold storing circuit being formed by closing the valve units connected to the refrigerant inlets of the first and second evaporators and by communicating the first through fourth bypass circuits with one another.

The system further comprises: refrigerant flow control means which, in operating the general cooling circuit and the cold radiating circuit simultaneously or separately, opens, upon start of the compressor or refrigerant gas pump, at least one of the valve units in the first and second bypass circuits, to allow refrigerant to flow between the general cooling circuit and the cold radiating circuit, detects the degree of over-cooling of refrigerant on the side of the refrigerant outlet of the cold storing heat exchanger, or on the side of the refrigerant outlet of the condenser, or the degree of overheating of refrigerant at the first or second evaporator, and closes the valve unit when the degree of over-cooling or over-heating of refrigerant thus detected reaches a predetermined value.

The system further comprises: a fifth bypass circuit which branches from the outlet of the condenser for bypassing the first pressure reducing mechanism, the fifth bypass circuit including a liquid receiver, a third pressure reducing mechanism, and a valve unit which are connected in the stated order.

The system further comprises: a sixth bypass circuit extended from the lower end of an accumulator connected to the inlet of the refrigerant gas pump through a valve unit to a gas pipe between the first bypass circuit and the fourth bypass circuit, the valve unit being opened for a predetermined period of time from the start of a heat storing operation of storing cold in the heat storing tank.

In the system, the fins of the first and second evaporators are combined together, to form a single heat exchanger whose heat exchange capacity is large enough for the operation of both the general cooling circuit and the cold radiating circuit.

Furthermore, the another object of the invention has been achieved by the provision of a heat storage type air conditioning system which comprises: a general cooling circuit including a compressor, a condenser, a first pressure reducing mechanism, and a first evaporator which are connected in the stated order, the general cooling circuit performing a cooling operation with the aid of the first evaporator; a cold radiating circuit including a refrigerant gas pump, a cold storing heat exchanger, a second pressure reducing mechanism, and a second evaporator which are connected in the stated order, the cold radiating circuit performing a cooling operation with the aid of the second evaporator; a heat storing tank containing a heat storing medium for storing cold with the aid of the cold storing heat exchanger; a first bypass circuit having a valve unit connected between a first gas pipe in the general cooling circuit and a second gas pipe in the cold radiating circuit, the valve unit being controlled for movement of refrigerant, a second bypass circuit having a valve unit connected between a first two-phase, gas and liquid, pipe which is connected between the first pressure reducing mechanism and the first evaporator and a second two-phase, gas and liquid, pipe which is connected between the second pressure reducing mechanism and the second evaporator, the valve unit being controlled for movement of refrigerant, and a third bypass circuit with a check valve, for bypassing the second pressure reducing mechanism; a fourth bypass circuit having a valve unit connected between the inlet and outlet of the refrigerant gas pump; and valve units provided at the inlets of the first and second evaporators, respectively, and in which in operation of the general cooling circuit, and the cold radiating circuit which performs a cooling operation by utilizing cold energy stored in the heat storing tank, the valve units of the first and second bypass circuits are closed, so that the general cooling circuit and the cold radiating circuit are operated independently of each other, and in a cold storing operation for the heat storing tank with the aid of the cold storing heat exchanger, the valve units are opened to open the first through fourth bypass circuits are opened by controlling the valve units, and the valve units provided at the inlets of the first and second evaporators are opened, to form a cold storing circuit with the general cooling circuit and the cold radiating circuit, which system, according to the invention, further comprises: load detecting means for detecting an amount of cooling load; and cooling circuit controlling means which operates the cold radiating circuit when the amount of cooling load thus detected is low, and operates the general cooling circuit when the amount of cooling load is high.

The heat storage type air conditioning system may comprises: ice detecting means for detecting the presence or absence of a piece of ice in the heat storing tank; and cold storing circuit controlling means for suspending the operation of the cold storing circuit when a piece of ice is detected by the ice detecting means.

Furthermore, the system may comprises: operation ratio outputting means for outputting a ratio in time period of a general cooling operation to a total cooling operation in a day; and cold storing time period controlling means for controlling the time period of operation of the cold storing circuit according to the ratio thus outputted.

In the heat storage type air conditioning system of the invention, the evaporators are provided in the general cooling circuit driven by the compressor and in the cold radiating circuit driven by the refrigerant pump, respectively, so that those circuits are able to operate independently of each other. Furthermore, the bypass circuits are provided to allow refrigerant to flow between the liquid pipes and between the gas pipes in those circuits. Hence, only when the bypass circuits are opened, the refrigerant is allow to flow between the circuits. In the cold storing operation, with the bypass circuits closed, the cold storing circuit is formed by the compressor, the condenser, the first pressure reducing mechanism, and the cold storing heat exchanger, so as to store cold energy in the heat storing tank. In the case where the two cooling circuits are operated simultaneously or separately, the bypass circuits are closed. Therefore, the cooling capacity is not decreased nor changed in the case where suitable quantities of refrigerant are held in the two circuits.

The system further comprises: the refrigerant flow control means which, in operating the general cooling circuit and the cold radiating circuit simultaneously or separately, opens, upon start of the compressor or refrigerant gas pump, the above-described bypass circuits, to adjust the quantities of refrigerant in the general cooling circuit and the cold radiating circuit to correct values. Hence, for instance when the quantity of refrigerant in the general cooling circuit becomes too large, the bypass circuits are opened to allow the refrigerant to flow into the cold radiating circuit, and they are closed when the degree of over-cooling of refrigerant in the cold radiating circuit reaches a suitable value. In the case where the quantity of refrigerant in the cold radiating circuit becomes too large, the degree of over-heating of refrigerant in the general cooling circuit is utilized for determination of a suitable quantity of refrigerant therein. Thus, when the quantity of refrigerant either in the general cooling circuit or in the cold radiating circuit becomes too large or too small, it can be readily adjusted to a correct value.

In the cold storing operation, the quantity of refrigerant may be relatively small Therefore, the liquid receiver may be provided at the outlet of the condenser so as to receive the refrigerant the quantity of which is surplus to the quantity of refrigerant required for the cold storing operation, and to discharge it in the cold storing operation. This is effective in correcting the quantity of refrigerant in each operation mode.

The system further comprises: another bypass circuit which is extended from the lower end of the accumulator in the cold radiating circuit through the gas pipe to the general cooling circuit. The bypass circuit is opened for a predetermined period of time from the start of the heat storing operation, thus allowing the oil to flow through the bypass circuit to the general cooling circuit. This eliminates the difficulty that the coil concentrates between the compressor and the refrigerant gas pump.

In the system, the fins of the evaporators in the general cooling circuit and the cold radiating circuit are combined together, to provide the single heat exchanger whose heat exchange capacity is large enough for the operation of both the general cooling circuit and the cold radiating circuit. Hence, in the case where the two circuits are operated in a parallel mode, they may have predetermined heat transmission effects, respectively, and in the case where one of the circuits is operated, the circuit can use the fins of the circuit which is not in operation. That is, in this case, the heat transmission area is doubled, and the heat exchange capacity is increased as much.

In the heat storage type air conditioning system of the invention, a cooling load to the air in a room, for instance the temperature of the air in the room which is sucked in during the cooling operation is detected by the load detecting means. When, after the start of the cooling operation, the cooling load is low; i.e., when the detected temperature of the air in the room is lower than a predetermined value, the cold radiating circuit is operated so that the cold radiating operation utilizing the stored cold is carried out; whereas, when the cooling load is high; i.e., when the detected temperature of the air in the room is higher than a predetermined value, in addition to the cold radiating operation the general cooling operation is carried out; that is, both the cold radiating operation and the general cooling operation are performed in a parallel mode.

The above-described operations are controlled by the cooling circuit controlling means. Hence, when the cooling load is low, the cold radiating operation can cover substantially 100% of the total cooling operation in a day. Even when the cooling load is at peak, in the fundamental part of the cooling load the degree of dependence on the stored cold of the cold radiating operation can be more than 50%.

When the ice detecting means detects a piece of ice in the heat storing tank before the start of the cold storing operation, the cold storing circuit controlling means operates to suspend the operation of the cold storing circuit.

When pieces of ice are in the heat storing tank, the temperature of the water in the tank is 6° C. or lower. This fact can be utilized for detection of the presence or absence of pieces of ice in the tank.

After the pieces of ice in the tank have been molten away, the cold storing operation is started.

The operation ratio outputting means operates to output a ratio in time period of a general cooling operation to a day's cooling operation, and the cold storing time period controlling means increases the time of operation of the cold storing circuit when the ratio thus outputted is large, and decreases it when small.

That is, the time period of the cold storing operation at nighttime; that is, the amount of cold stored at nighttime is changed according to the ratio in time of the general cooling operation to the cooling operation performed during daytime every day.

When the ratio is for instance 80% or higher, the cold storing operation time is increased one step; whereas when it is for instance 20%, it is decreased one step.

The cold storing operation time is controlled in three steps, 0%, 50% and 100%, where 100% corresponds to the time period required for storing the maximum amount of cold in the heat storing tank. That is, control is so made that no pieces of ice remain in the heat storing tank at the end of the day's cooling operation. Thus, the degree of dependence of the cooling operation On the stored cold is higher than in the conventional system in which there are only two kinds of cold storing time; i.e., a 100% cold storing time, and 0% cold storing time.

DETAILED DESCRIPTION OF PREFERRED EMBODIMENTS

First Embodiment

A first embodiment of this invention will be described with reference to FIGS. 1 through 5.

Figure 1:
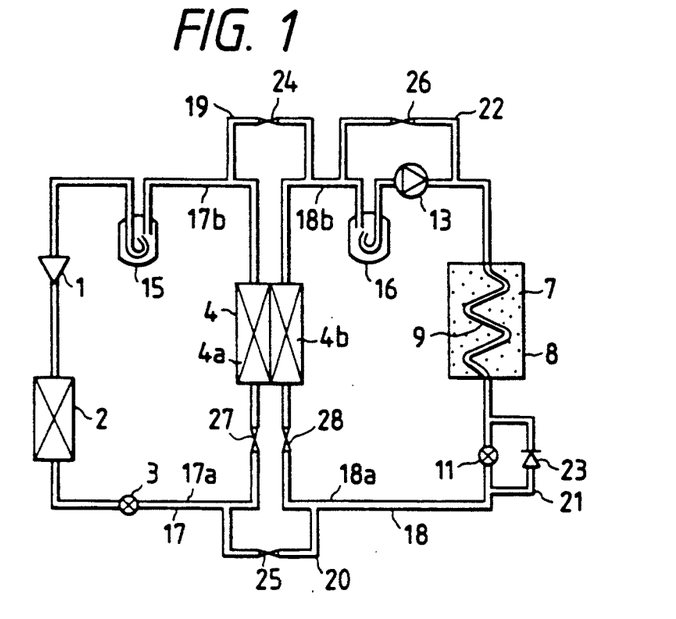
FIG. 1 is a piping diagram showing the arrangement of an example of a heat storage type air conditioning system, which constitutes a first embodiment of this invention.

FIG. 1 is a piping diagram showing the arrangement of a heat storage type air conditioning system, which constitutes the first embodiment of the invention. In FIG. 1, reference numeral 1 designates a compressor; 2, a condenser; 3, a first pressure reducing mechanism; 4a, a first evaporator; and 15, a first accumulator. Those circuit elements 1, 2, 3, 4a and 15 forms a general cooling circuit 17. In the general cooling circuit, cooling is carried out with the aid of the aforementioned first evaporator 4a.

Further in FIG. 1, reference numeral 13 designates a refrigerant gas pump; 9, a cold storing heat exchanger; 11, a second pressure reducing mechanism; 4b, a second evaporator; and 16, a second accumulator. Those circuit elements 13, 9, 11, 4b and 16 form a cold radiating circuit. In the cold radiating circuit, cooling is carried out with the aid of the second evaporator. Further in FIG. 1, reference numeral 7 designates a heat storing medium for storing cold (low temperature) with the aid of the cold storing heat exchanger 9; and 8, heat storing tank containing the heat storing medium 7. The heat storing medium 7 is for instance water. In this case, heat storing means converts the water into ice so that a larger part of the cold is stored as latent heat. The above-described first and second evaporators 4a and 4b are provided separately in a refrigerant circuit; however, their heat exchange sections may be provided in one and the same air duct, or in separate air ducts, respectively.

Further in FIG. 1, reference numerals 19 and 20 designate a first bypass circuit, and a second bypass circuit, respectively. In the first bypass circuit 19, refrigerant is allowed to flow by controlling a valve unit 24 which is connected between a first gas pipe 17b connected to the inlet of the first accumulator 15 and a second gas pipe 18b connected to the inlet of the second accumulator 16. In the second bypass circuit 20, refrigerant is allowed to flow by controlling a valve unit 25 which is connected between a first liquid pipe 17a and a second liquid pipe 18a. The first liquid pipe 17a is connected between the first pressure reducing mechanism 3 and the first evaporator 4a, and the second liquid pipe 18a is connected between the second pressure reducing mechanism 11 and the second evaporator 4b. Those first and second bypass circuits 19 and 20 serve as a main circuit in a cold storing operation, and are used as a refrigerant moving circuit between the general cooling circuit and the cold radiating circuit in the general cooling operation and in the cold radiating operation.

Further in FIG. 1, reference numeral 21 designates a third bypass circuit which includes a check valve 23 to bypass the second pressure reducing mechanism 11 in a cold storing operation which is carried out for the heat storing tank 8 with the aid of the cold storing heat exchanger 9; 22, a fourth bypass circuit connected between the outlet of the refrigerant gas pump 13 and the inlet of the second accumulator 16, including a valve unit 26; and 27 and 28, valve units provided at the inlets of the first and second evaporators 4a and 4b, respectively.

Figure 2:
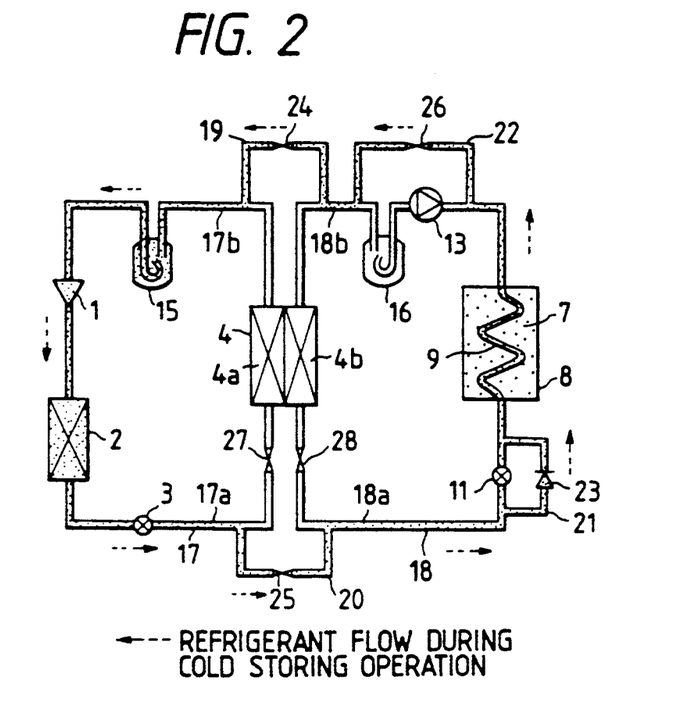
FIG. 2 is a circuit diagram for a description of a cold storing operation of the system shown in FIG. 1.

FIG. 2 is a circuit diagram for a description of a heat storing operation which is performed mainly during a midnight power time zone (refrigerant flowing in the directions of the broken-line arrows). The valve units 27 and 28 are closed, and the valve units 24, 25 and 26 are opened. Under this condition, the compressor 1 is operated with the refrigerant gas pump 13 stopped. As a result, the compressor 1 discharges a refrigerant gas at high temperature and at high pressure. The refrigerant gas thus discharged radiates heat at the condenser 2, and it is condensed into a liquid. The refrigerant liquid, being subjected to adiabatic expansion by the first pressure reducing means 3, is converted into a two-phase, gas and liquid, fluid. The fluid flows through the second bypass circuit 20 into the second liquid pipe 18a in the heat radiating circuit 18, and then flows into the heat storing heat exchanger 9 through the check valve 23 in the third bypass circuit 1. At the heat exchanger 9, the fluid receives heat from the heat storing medium 7, thus being gasified. The refrigerant thus gasified returns through the fourth bypass circuit 22 and the first bypass circuit 19 to the first gas pipe 17b in the general cooling circuit 17, and through the first accumulator 15 to the compressor 1. In the above-described operation, the heat storing medium 7 is freezed, thus storing heat at low temperature; i.e., cold.

Figure 3:
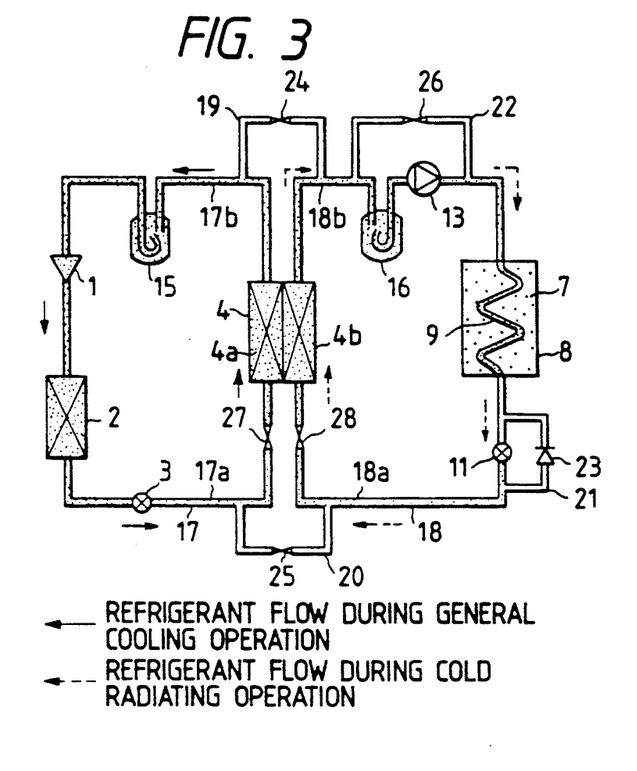
FIG. 3 is a circuit diagram for a description of a general cooling operation and a cold radiating operation of the system shown in FIG. 1.

In the case where, after the above-described heat storing operation, the general cooling operation or the cold radiating operation based on heat storage is carried out, or both are carried out in a parallel mode, as shown in FIG. 3 the valves units 24, 25 and 26 are closed and the valve units 27 and 28 are opened, and under this condition the compressor 1 and the refrigerant gas pump 13 are operated separately or simultaneously.

In the operation of the general cooling circuit 17 (the directions of flow of refrigerant as indicated by the solid-line arrows), a refrigerant gas at high temperature and at high pressure discharged from the compressor 1 is condensed by the condenser 2, and converted into a two-phase, gas and liquid, fluid being subjected to adiabatic expansion by the first pressure reducing mechanism 3. The fluid thus formed flows to the first evaporator 4a, where it receives heat from outside, thus cooling the surrounding air. At the same time, the fluid itself evaporates, thus providing a refrigerant gas. The refrigerant gas is returned through the first accumulator 15 to the compressor 1.

In the operation of the cold radiating circuit 18 (the directions of flow of refrigerant as indicated by the one-dot chain line arrows), a refrigerant gas at low temperature and at low pressure which is pressurized by the refrigerant gas pump 12 flows into the cold storing heat exchanger 9, where it gives heat to the heat storing medium 7, and it is liquified being condensed. The refrigerant thus liquified, being subjected to adiabatic expansion by the second pressure reducing mechanism 11, is formed into a two-phase, gas and liquid, fluid at low temperature. The liquid flows into the second evaporator 4b, where it receives heat from outside, thus cooling the surrounding air. At the same time, the fluid evaporates, forming a refrigeration gas. The refrigerant gas is returned through the second accumulator 16 to the refrigerant gas pump 13. In the above-described operation, the pump 13 is used as a refrigerant gas pump; however, it may be connected to the outlet of the heat exchanger 9 so that it is used as a refrigerant liquid pump.

In the case where the general cooling operation and the cold radiating operation are carried out in a parallel mode, the bypass circuits 19 and 20 between the general cooling circuit and the cold radiating circuit are closed, and therefore the refrigerating cycles thereof are independent of each other; that is, neither refrigerant nor ice machine oil are moved between those circuits. Accordingly, in the case where a suitable quantity of refrigerant and a suitable quantity of ice machine oil are held in the two circuits, the system is free from difficulties that the cooling capacity is decreased or changed, and the quantity of ice machine oil is decreased, thus adversely affecting the operation of the compressor.

As is apparent from the above description, the compressor-driven general cooling circuit, and the refrigerant-gas-pump-driven cold radiating circuit are independent of each other. This arrangement eliminates the difficulties accompanying the conventional air conditioning system, in which the refrigerant condensed by the condenser and the refrigerant condensed by the heat storing heat exchanger meet together, and are gasified by one and the same evaporator, that the general cooling circuit and the cold radiating circuit become unbalanced in the quantity of refrigerant and in the quantity of ice machine oil, which adversely affects the operating conditions of the system, so that the cooling capacity is decreased, the quantity of refrigerant is excessively increased or decreased, thus causing pressure rise or liquid back, and the ice machine oil is used up with the bearing of the compressor being seized. In addition, with the system, the general cooling operation, and the cold radiating operation can be performed optionally.

Figure 4:
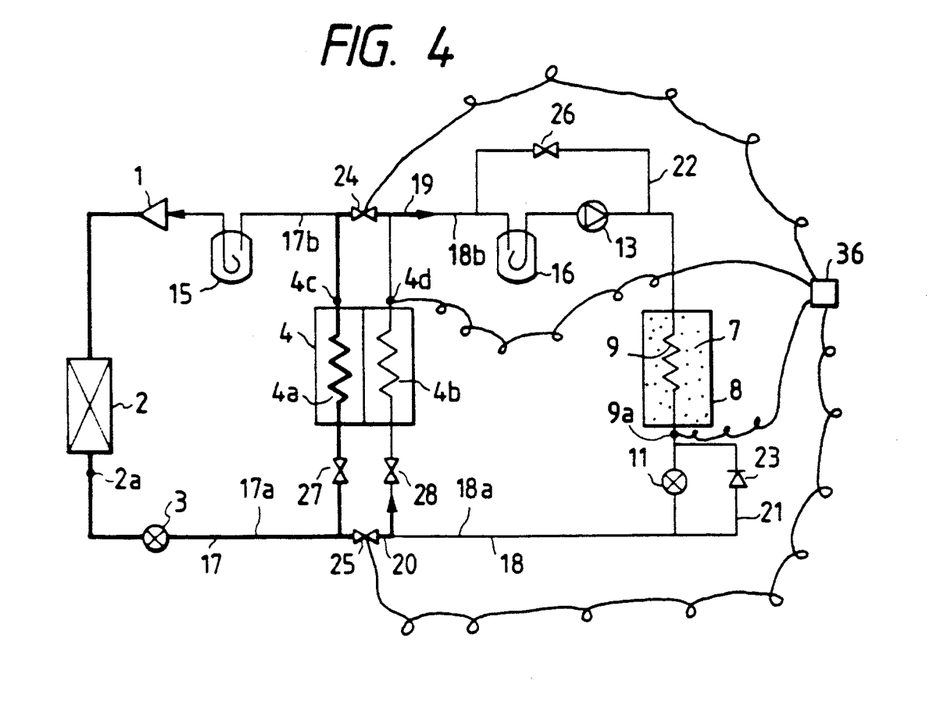
FIG. 4 is an explanatory diagram for a description of a method of moving refrigerant in the system shown in FIG. 1.
Figure 5:
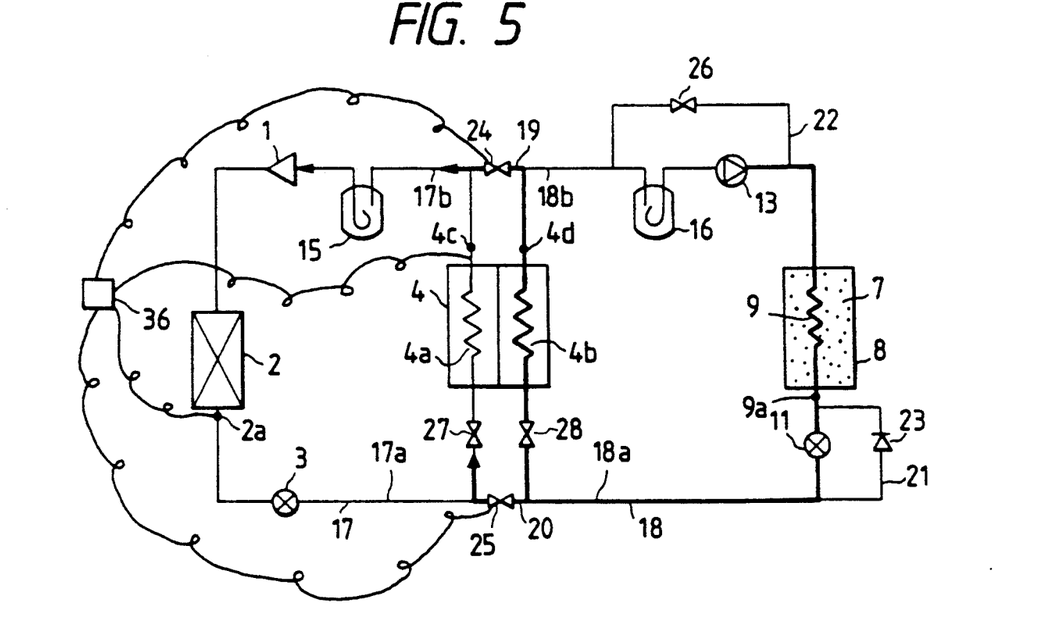
FIG. 5 is an explanatory diagram for a description of another method of moving refrigerant in the system shown in FIG. 1.

FIGS. 4 and 5 are operational diagrams for a description of one example of a refrigerant shifting method which is employed when, in the general cooling operation and in the cold radiating operation, the quantities of refrigerant in the circuits become too large or too small.

FIG. 4 shows an operation which is carried out when the quantity of refrigerant in the general cooling circuit is too large, while the quantity of refrigerant in the cold radiating circuit is too small (the direction of movement of refrigerant being indicated by the heavy-line arrows). By opening the valve unit 24 in the first bypass circuit 19 and the valve unit 25 in the second bypass circuit 20, the refrigerant is moved to the cold radiating circuit. Whether or not the quantity of refrigerant in the cold radiating circuit is sufficient is determined when the degree of over-cooling of the refrigerant in a pipe 4d connected to the outlet of the heat exchanger 9 is increased to a predetermined value, or when the degree of over-heating of the refrigerant in a pipe 4d connected to the outlet of the second evaporator is decreased to a predetermined value. A detection signal of the above-described refrigerant over-cooling or over-heating degree is applied to a decision mechanism 36. After the latter 36 has determined it in response to the detection signal that the quantity of refrigerant in the circuit is sufficient, instruction signals are supplied to close the valve units 24 and 25, thereby to suspend the movement of the refrigerant.

In contrast to FIG. 4, FIG. 5 shows an operation which is performed when the quantity of refrigerant in the general cooling circuit is too small, while the quantity of refrigerant in the cold radiating circuit is too large (the direction of movement of refrigerant being indicated by the heavy-line arrows). By opening the valve unit 24 in the first bypass circuit 19 and the valve unit 25 in the second bypass circuit 20, the refrigerant is moved to the general cooling circuit. Whether or not the quantity of refrigerant in the general cooling circuit is sufficient is determined when the degree of over-heating of the refrigerant in a pipe 4c connected to the outlet of the first evaporator 4a is decreased to a predetermined value, or when the degree of over-cooling of the refrigerant in a pipe 2a connected to the outlet of the condenser 2 is increased to a predetermined value. A detection signal of the above-described refrigerant over-heating or over-cooling degree is applied to the decision mechanism 36. After the latter 36 has determined it in response to the detection signal that the quantity of refrigerant in the circuit is sufficient, instruction signals are supplied to close the valve units 24 and 25, thereby to suspend the movement of the refrigerant.

The quantities of refrigerant in the general cooling circuit and in the cold radiating circuit are controlled as described above. Hence, when the quantity of refrigerant in one of the two circuits is too large while the quantity of refrigerant in the other circuit is too small, or vice versa, the quantities of refrigerant in the circuits can be readily corrected. When the environment conditions of the system change or the load on the side of the heat storing heat exchanger changes, the quantities of refrigerant in the circuits are gradually made unbalanced. In addition, at the start of the general cooling operation after the cold radiating operation, the quantities of refrigerant in the two circuits are generally much different from the predetermined reference values.

Those unbalanced quantities of refrigerant cannot be corrected without the above-described adjusting operations.

Second Embodiment

A second embodiment of the invention will be described with reference to FIG. 6, in which parts corresponding functionally to those which have been described with reference to FIG. 1 (the first embodiment) are therefore designated by the same reference numerals or characters.

Figure 6:
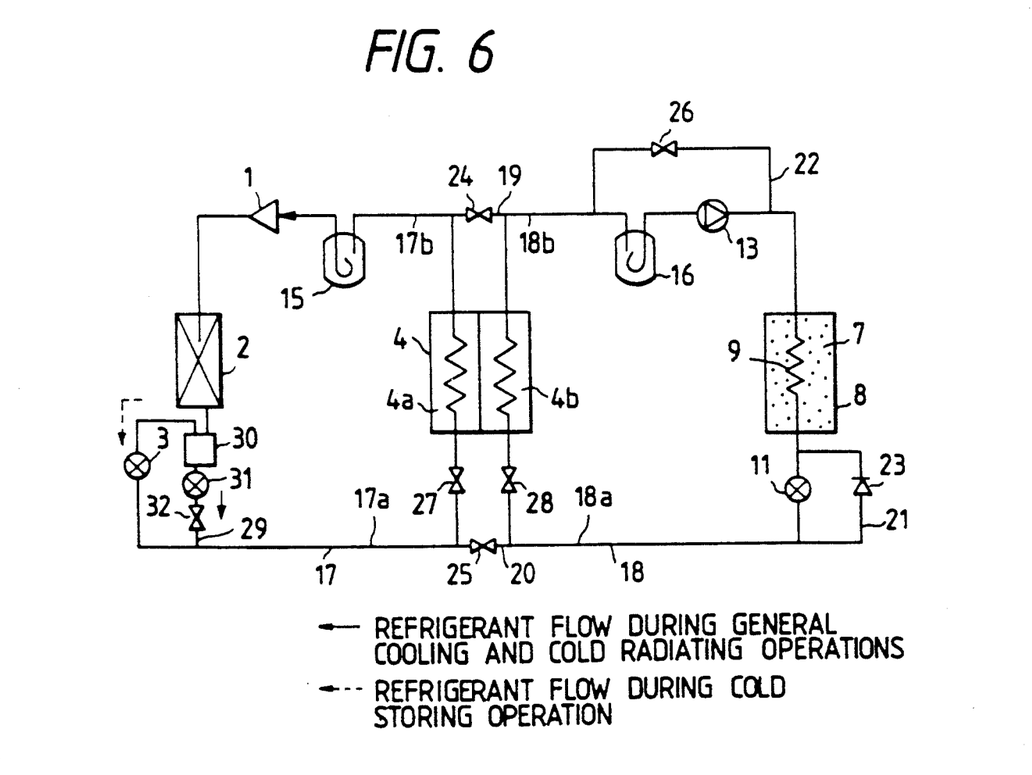
FIG. 6 is a piping diagram showing the arrangement of another example of the heat storage type air conditioning system, which constitutes a second embodiment of the invention.

FIG. 6 is a piping diagram showing the whole arrangement of another example of the heat storage type air conditioning system, which constitutes the second embodiment of the invention. In FIG. 6, reference numeral 29 designates a fifth bypass circuit which branches from the outlet of the condenser 2 to bypass the first pressure reducing mechanism 3. The fifth bypass circuit 29 includes a liquid receiver 30, a third pressure reducing mechanism 31, and a valve unit 32 which are connected in the stated order.

As was described before, the quantities of refrigerant required for the cold storing operation, the general cooling operation, and the cold radiating operation, are somewhat different from one another. That is, the quantities of refrigerant required for the general cooling operation or the cold storing operation is relatively small, whereas the quantity of refrigerant required for the cold radiating operation is relatively large. Hence, in the cold storing operation, a larger part of the quantity of refrigerant sealed in the whole circuit is surplus. When the cold radiating operation is performed, or when the cold radiating operation and the general cooling operation are performed in a parallel mode, a large quantity of refrigerant is required, and accordingly, it is necessary to provide means for temporarily receiving and discharging refrigerant. In order to meet this requirement, in the second embodiment, refrigerant recovering means is provided; more specifically, a liquid receiver 30 for storing a condensed liquid is provided. In the cold storing operation, the valve unit 32 is closed, so that the liquid receiver 30 is filled with refrigerant liquid, and the refrigerant liquid is supplied to the first pressure reducing mechanism 3, where it is subjected to adiabatic expansion. In this operation, the refrigerant is stored in the liquid receiver 30 to the quantity which is obtained by subtracting the quantity of refrigerant required for the cold storing operation from the quantity of refrigerant in the whole circuit. Next, in the general cooling operation, and in the cold radiating operation, the liquid receiver 30 is emptied with the valve unit 32 opened, so that the refrigerant liquid is supplied to the third pressure reducing mechanism 31, where it is subjected to adiabatic expansion. In this case, it is necessary to adjust the quantities of refrigerant in the two circuits. However, since the liquid receiver 30 is provided on the high pressure side of the general cooling circuit, it can be readily achieved to move the refrigerant from the general cooling circuit to the cold radiating circuit. Quantity-of-refrigerant adjusting means using the first and second bypass circuits shown in the first embodiment is used to adjust the quantities of refrigerant in the refrigerant circuits.

Third Embodiment**

A third embodiment of the invention will be described with reference to FIG. 7, and FIG. 1 (the first embodiment) are therefore designated by the same reference numerals or characters.

Figure 7:
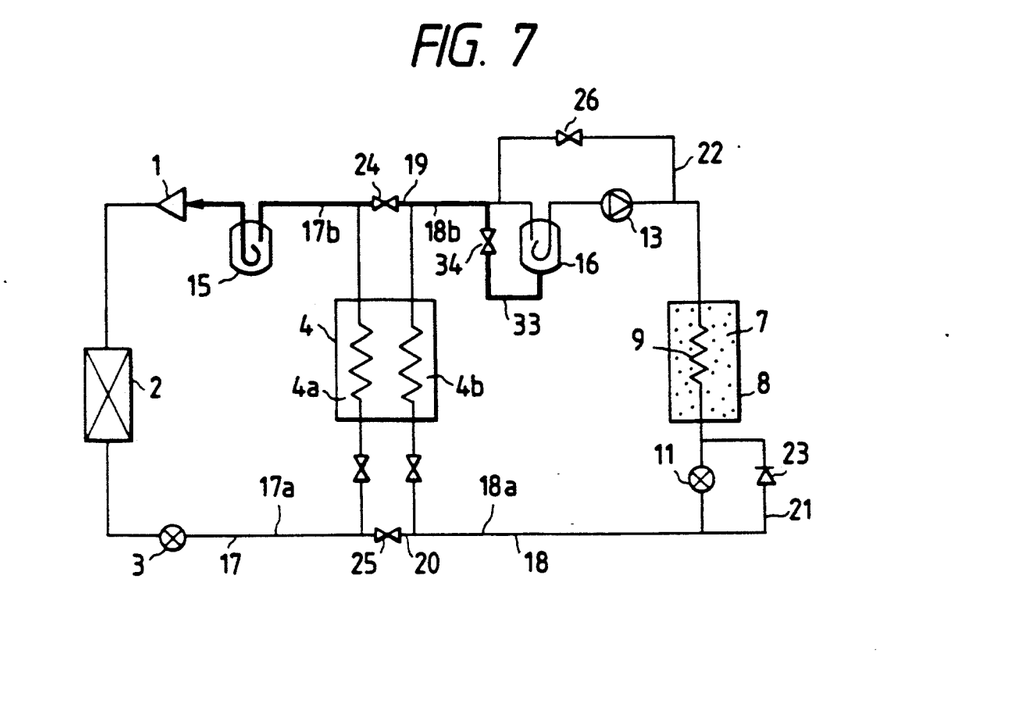
FIG. 7 is a piping diagram showing the arrangement of another example of the heat storage type air conditioning system, which constitutes a third embodiment of the invention.

FIG. 7 is a piping diagram showing the whole arrangement of another example of the heat storage type air conditioning system, which constitutes the third embodiment of the invention (the directions of flow of ice machine oil being indicated by the heavy-line arrow). In FIG. 7, reference numeral 33 designates a sixth bypass circuit which is extended from the bottom of the second accumulator 16 through a valve unit 34 to the second gas pipe 18b connected between the first bypass circuit 19 and the fourth bypass circuit 22. In the bypass circuit 33, the valve unit 34 is opened for a certain period of time from the start of the cold storing operation in which cold is stored in the heat storing tank 8. This is due to the following reason: In general, in the cold storing operation, the ice machine oil is liable to concentrate at the heat storing heat exchanger 9 having a relatively large heat radiation area in the cold radiating circuit, and therefore it is necessary to return the oil collected in the second accumulator 16 during the cold radiating operation to the general cooling circuit. With the third embodiment, the difficulty can be eliminated that the oil concentrates between the compressor and the refrigerant gas pump, especially at the pump.

Fourth Embodiment

A fourth embodiment of the invention will be described with reference to FIGS. 8 and 9.

Figure 8:
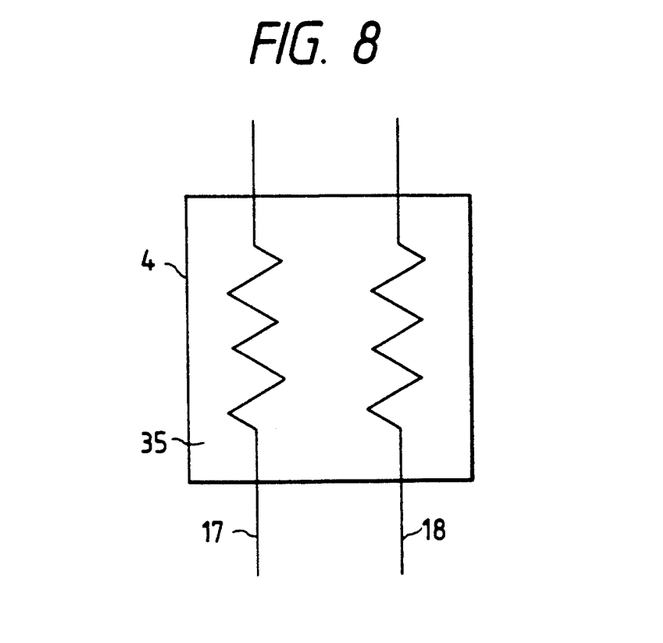
FIG. 8 is an explanatory diagram showing an example of an evaporator in another example of the heat storage type air conditioning system, which constitutes a fourth embodiment of the invention.
Figure 9:
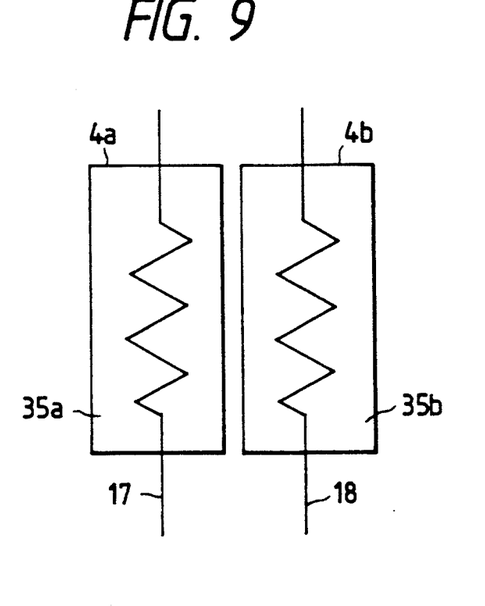
FIG. 9 is an explanatory diagram showing another example of the evaporator in the system shown in FIG. 8.

FIG. 8 is an explanatory diagram showing the arrangement of an evaporator in another example of the heat storage type air conditioning system, which constitutes the fourth embodiment of the invention. In FIG. 7, reference numeral 35 designates fins which are common for both the general cooling circuit 17 and the cold radiating circuit 18. The fins 35 form, as a whole, a single heat exchanger whose heat exchange capacity is enough for the operation of both the general cooling circuit 17 and the cold radiating circuit 18. FIG. 9 shows a heat exchanger in which, similarly as in the first embodiment, evaporators of the two circuits are provided independently of each other. In the case where the general cooling circuit 17 and the cold radiating circuit 18 are operated simultaneously, the amount of heat exchange in the former circuit 17 is substantially equal to that in the latter circuit 18. However, in the case where only one of the circuits 17 and 18 operates, the effective heat transmission area is increased, because the one circuit in operation can utilize the fins of the other circuit which is not in operation; that is, in the case where only one of the two circuits is in operation, the amount of heat exchange is increased as much.

Fifth Embodiment

A fifth embodiment of this invention will be described with reference to FIGS. 10 through 12.

Figure 10:
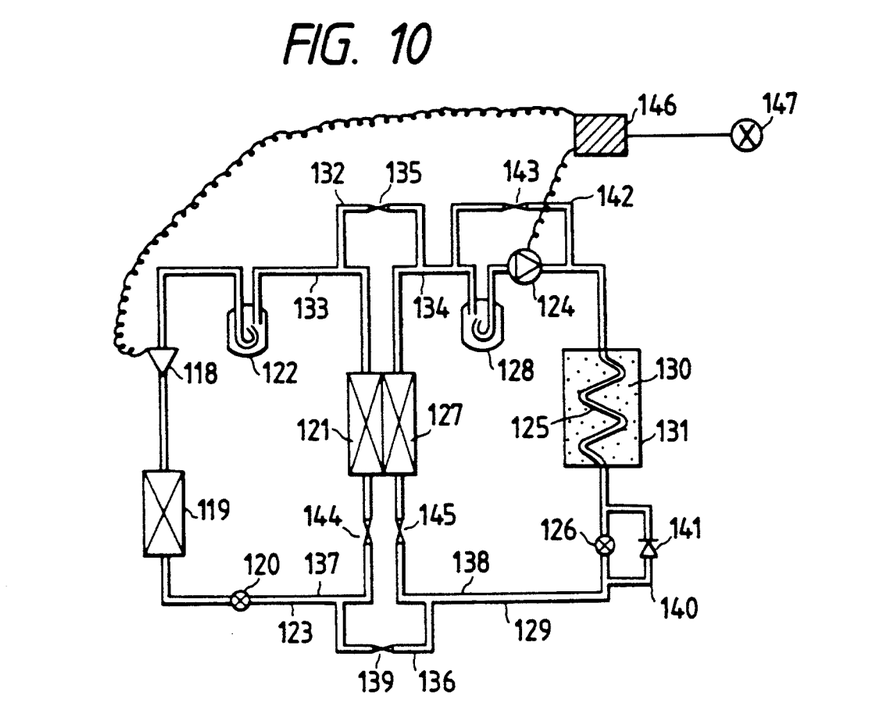
FIG. 10 is a piping diagram showing the arrangement of a heat storage type air conditioning system, which constitutes one embodiment of this invention.

FIG. 10 is a piping diagram showing the arrangement of a heat storage type air conditioning system, which constitutes the first embodiment of the invention.

In FIG. 10, reference numeral 118 designates a compressor; 119, a condenser; 120, a first pressure reducing mechanism; 121, a first evaporator; and 122, a first accumulator. Those elements 119 through 122 are connected in the stated order, thus forming a general cooling circuit 123.

Further in FIG. 10, reference numeral 124 designates a refrigerant gas pump; 125, a cold storing heat exchanger; 126, a second pressure reducing mechanism;

127, a second evaporator; and 128, a second accumulator. Those elements 124 through 128 are connected to one another in the stated order, thus forming a cold radiating circuit 129. The circuit 129 performs a cooling operation with the aid of the second evaporator 127. Further in FIG. 10, reference numeral 130 designates a cold storing medium adapted to store cold (low temperature) with the aid of the heat exchanger 125; and 131, a heat storing tank containing the cold storing medium 130. The cold storing medium 130 may be water. In this case, heat storing means converts the water into ice so that a larger part of the cold is stored as latent heat.

Further in FIG. 10, reference numerals 132 and 136 designate first and second bypass circuits, respectively. The first bypass circuit 132 includes a valve unit 135 which is connected between a first gas pipe 133 connected to the inlet of the first accumulator 122 and a second gas pipe 133 connected to the inlet of the second accumulator 128. By controlling (opening and closing) the valve unit 135, the refrigerant is allowed to move. The second bypass circuit 136 has a valve unit 139 which is connected between a first two-phase, gas and liquid, pipe 137 (hereinafter referred to as "a first two-phase pipe 137", when applicable), and a second two-phase, gas and liquid, pipe 138 (hereinafter referred to as "a second two-phase pipe 138", when applicable). The first two-phase pipe 137 is connected between the first pressure reducing mechanism 120 and the first evaporator 121. The second two-phase pipe 138 is connected between the second pressure reducing mechanism 126 and the second evaporator 127. Similarly, by controlling the valve unit 139, the refrigerant is allowed to move.

Those first and second bypass circuits 132 and 136 form a main circuit in the cold storing operation.

Further in FIG. 10, reference numeral 140 designates a third bypass circuit including a check valve 141 which is operated to bypass the second pressure reducing mechanism 126 when cold (low temperature) is stored in the heat storing tank 131 with the aid of the cold storing heat exchanger; 142, a fourth bypass circuit which includes a valve unit 143 connected between the outlet of the refrigerant gas pump 124 and the inlet of the second accumulator 128; and 144 and 145, valve units provided at the inlets of the first and second evaporators 121 and 127, respectively.

Further in FIG. 10, reference numeral 146 designates an operation instructing unit which applies operation instructions to the compressor 118 and the refrigerant gas pump 114 according to on-off signals outputted by a two-stage thermostat 147. The latter 147 operates on the temperature of the air in the room which is sucked in. That is, the two-stage thermostat 147 is load detecting means, and the operation instructing unit 146 is cooling circuit controlling means.

In the heat storing operation in the midnight-power time zone, the valve units 144 and 145 are closed, and the valve units 135, 139 and 143 are opened. Under this condition, the compressor 118 is operated with the refrigerant gas pump 124 stopped. As a result, the compressor 118 discharges a refrigerant gas at high temperature and at high pressure. The refrigerant gas thus discharged radiates heat at the condenser 102, so that it is condensed into a refrigerant liquid. The refrigerant liquid, being subjected to adiabatic expansion by the first pressure reducing means 103, is converted into a two-phase, gas and liquid, fluid. The fluid flows through the second bypass circuit 136 into the second liquid pipe 138 in the heat radiating circuit 129, and then flows into the heat exchanger 125 through the check valve 141 in the third bypass circuit 140. At the heat exchanger 109, the fluid receives heat from the heat storing medium 130, thus being gasified.

The refrigerant thus gasified returns through the fourth bypass circuit 142 and the first bypass circuit 132 to the first gas pipe 133 in the general cooling circuit 123, and through the first accumulator 122 to the compressor 101.

In the above-described operation, the heat storing medium 130 is freezed, thus storing cold (low temperature) in the heat storing tank 131.

In the case where, after the above-described heat storing operation, the general cooling operation or the cold radiating operation using the stored cold is carried out, or both are carried out in a parallel mode, the valves units 135, 139 and 143 are closed, and the valve units 144 and 145 are opened, and under this condition the compressor 118 and the refrigerant gas pump 124 are operated separately or simultaneously.

In the operation of the general cooling circuit 123, the refrigerant gas at high temperature and at high pressure discharged from the compressor 118 is condensed by the condenser 119, and converted into a two-phase, gas and liquid, fluid being subjected to adiabatic expansion by the first pressure reducing mechanism 120. The fluid thus formed flows to the first evaporator 121, where it receives heat from outside, thus cooling the surrounding air. At the same time, the fluid itself evaporates, thus forming a refrigerant gas. The refrigerant gas is returned through the first accumulator 122 to the compressor 118.

In the operation of the cold radiating circuit 129, the refrigerant gas at low temperature and at low pressure which is pressurized by the refrigerant gas pump 124 flows into the heat exchanger 125, where it gives heat to the cold storing medium 130, thus being condensed into a refrigerant liquid. The refrigerant liquid, being subjected to adiabatic expansion by the second pressure reducing mechanism 126, is formed into a two-phase, gas and liquid, fluid at low temperature. The fluid flows into the second evaporator 127, where it receives heat from outside, thus cooling the surrounding air. At the same time, the fluid evaporates, forming a refrigeration gas. The refrigerant gas is returned through the second accumulator 128 to the refrigerant gas pump 124.

In the above-described embodiment, the refrigerant gas pump is employed; however, it may be connected to the outlet of the heat exchanger 125 so that it is used as a refrigerant liquid pump.

In the case where the general cooling operation and the cold radiating operation are carried out in a parallel mode, the bypass circuits 132 and 136 between the general cooling circuit and the cold radiating circuit are closed.

Figure 11:
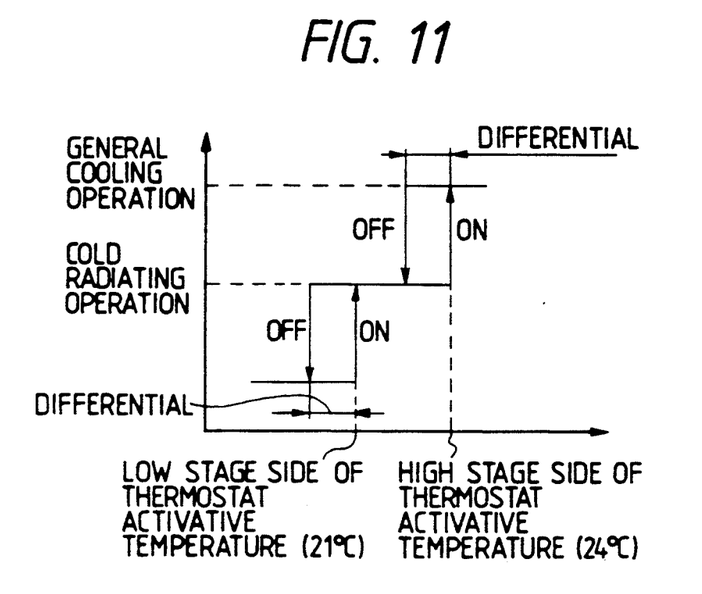
FIG. 11 is a graphical representation for a description of the operation of a two-stage step type thermostat in a cooling operation of the system of the invention.

FIG. 11 is a diagram for a description of the operation of the two-stage step type thermostat 147. In the case where only the low stage side of the thermostat is activated, the cold radiating operation only is carried out for cooling the air in the room, and when a low-stage side operating temperature differential (for instance 3° C.) occurs with the low-stage side, the cooling operation is suspended.

In the case where the high-stage side of the thermoset is activated, the cold radiating operation and the general cooling operation are performed simultaneously, and when a high-stage side operating temperature differential (for instance 3° C.) occurs with the high-stage side, only the cold radiating operation is carried out. If, when the high-stage side is activated, the amount of heat stored is zero, only the general cooling operation only is carried out.

With the low-stage and high-stage operating temperature differentials maintained unchanged, the set temperatures may be changed to higher or lower than a temperature at that time.

Figure 12A:
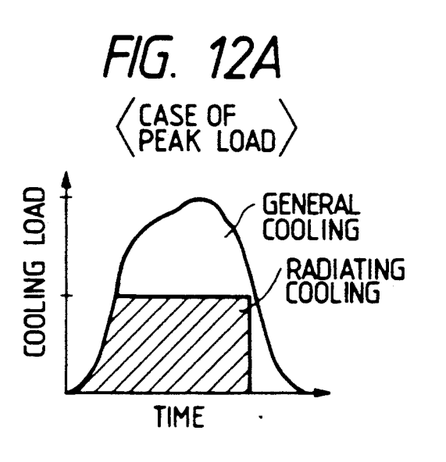
FIG. 12A is a graphical representation showing the ratio in time of a cold radiating operation and a general cooling operation with respect to a total cooling load when the cooling load is at peak.
Figure 12B:
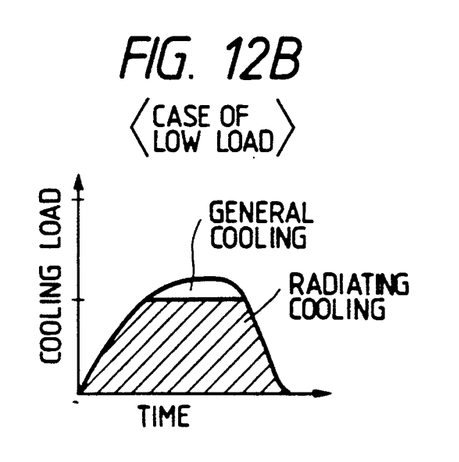
FIG. 12B is a graphical representation indicating such a ratio when the cooling load is low.

FIGS. 12A and 12B are diagrams showing how much the cold radiating operation and the general cooling operation cover the total cooling load in the case where the cooling load changes during the cooling operation. When the load is at peak, the cold radiating operation using the stored cold is performed to cover at least 50% of the total cooling load; and when the load is low, it is carried out to cover substantially 100% of the total cooling load.

Sixth Embodiment

A sixth embodiment of the invention will be described with reference to FIG. 13.

Figure 13:
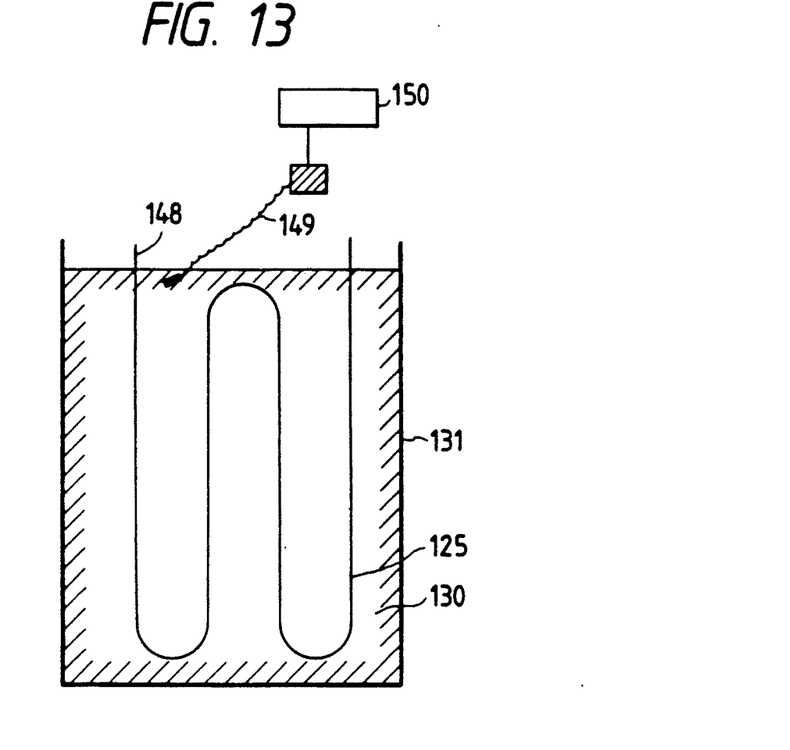
FIG. 13 is an explanatory diagram for a description of the measurement of the temperature of the water in a heat storing tank in the system of the invention.

FIG. 13 is a diagram for a description of the measurement of the temperature of the water in the heat storing tank. The temperature of the water in the upper portion of the heat storing tank 131 near the cold-radiating-operation output 148 of the cold storing heat exchanger is measured with ice detecting means, namely, a thermistor type temperature detecting mechanism 149. This is due to the fact that ice is most liable to remain at the outlet of the condenser because the refrigerant is excessively cooled there. The temperature of the water there is detected with the temperature detecting mechanism 149. When it is 6° C. or lower, cold-storing-circuit control means, namely, a cold-storing-circuit controlling circuit 150 determines that pieces of ice remain in the heat storing tank 131, and therefore the cold storing operation is not carried out.

Seventh Embodiment

A seventh embodiment of the invention will be described with reference to FIG. 14.

Figure 14:
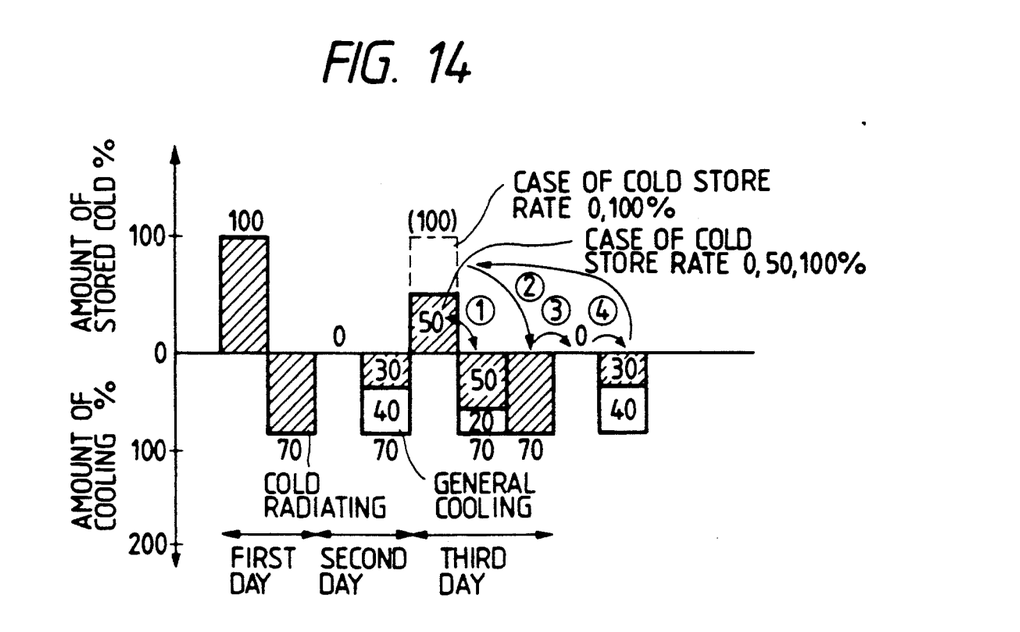
FIG. 14 is an explanatory diagram indicating amounts of cold stored with amounts of cooling calory in the case where the cooling load is low.

FIG. 14 is a diagram indicating relationships between cold storing capacities and cooling capacities detected over several days.

In FIG. 14, it is assumed that the amount of cold stored on the first day is 100%, and a cooling load is 70% every day. In this case, on the first day, 30% of the amount of cold thus stored is left over at the end of the cooling operation. On the second day, 30% of the 70% cooling load is covered by the amount of cold thus left over, and the remaining 40% is covered by the general cooling operation.

In the case where, as in the prior art, there are only two kinds of cold storing time; i.e., a 100% cold storing time, and 0% cold storing time, the cold storing operation must be carried out to 100% on the third day, and therefore the cooling operation is such that the amount of cold stored is utilized 30% every other day (i.e., the degree of dependence on the stored cold is 43%) (cf. (2), (3) and (4) in FIG. 14).

On the other hand, in the invention, the cold storing time period calculation is as follows: On the first day, the time period required for the general cooling operation is less than 20% of the total cooling time period. Therefore, on the third day, the amount of heat stored is 50%, and, from that day on, the degree of dependence on the stored cold is 71.4% (=50/70) (cf. (1) in FIG. 14).

Figure 15:
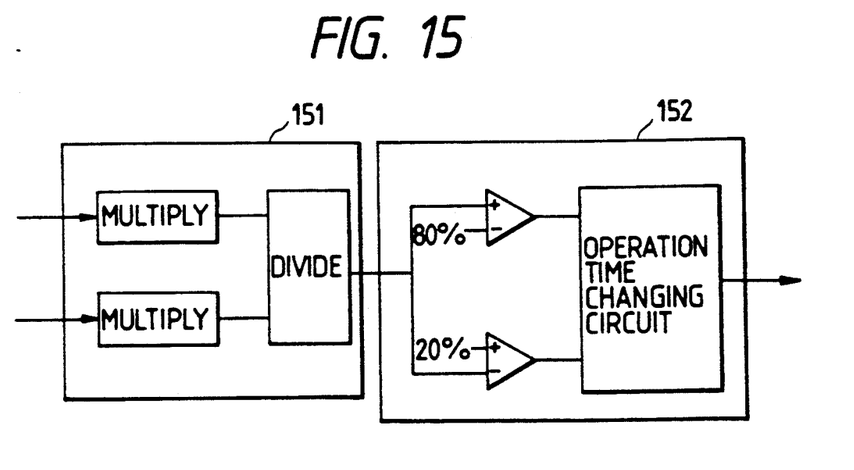
FIG. 15 is a block diagram showing the arrangement of a control circuit in the system of the invention.

The above-described ratio in time of "general cooling operation" to "total cooling operation" per day is detected by operation ratio outputting means 151, which comprises an operation time integrating circuit and an arithmetic circuit as shown in FIG. 15. The ratio thus detected is applied to cold storing time controlling means 152 which comprises a comparison circuit such as a window comparator and an operation time changing circuit, so that the next cold storing time period can be controlled (increased or decreased).

The above-described operation time ratio, and cold storing operation time period may be controlled with manual setting means.

As was described above, when the ratio in time of the general cooling operation to the total cooling operation during the daytime is a predetermined value (for instance 80%) or higher, the next cold storing operation time period is increased one step; and when the ratio is another predetermined value (for instance 20%) or less, the cold storing operation time period is decreased one step; that is, the cold storing operation time is controlled in three steps, 0%, 50% and 100% (where 100% corresponds to the time period required for storing the maximum amount of cold in the heat storing tank). Hence, the degree of dependence on the stored cold is substantially prevented from fluctuating every day; that is, it can be standardized.

As was described above, in the heat storage type air conditioning system of the invention, the evaporators are provided in the compressor-driven general cooling circuit driven by the compressor and the cold radiating circuit driven by the refrigerant pump, respectively, so that those circuits operate independently of each other, and the bypass circuits are provided to allow refrigerant to flow between the liquid pipes and between the gas pipes in those circuits. Hence, if, in the case where the general cooling circuit and the cold radiating circuits are operated simultaneously or separately under the condition that they are isolated from each other, the suitable quantities of refrigerant are held in the two circuits, then the system is free from the difficulty that the circuits are lowered in cooling capacity or the ice machine oil concentrates at a certain point in the system. Thus, the system of the invention is high in reliability. Furthermore, in the system of the invention, it is unnecessary to provide means which operates to adjust the capacity of the compressor or refrigerant pump thereby to control the ratio of a flow rate of refrigerant in the general cooling circuit to that of refrigerant in the cold radiating circuit. Therefore, the manufacturing cost of the system can be reduced as much. For instance in the case one of the two circuits suffers from a trouble, such as leakage of gas from the piping, a temporary cooling operation can be performed by using the other circuit. This means that the system is high in marketability.

The system includes the refrigerant flow control means which, in operating the general cooling circuit and the cold radiating circuit simultaneously or separately, opens, upon start of the operation, the above-described bypass circuits, to adjust the quantities of refrigerant in the general cooling circuit and the cold radiating circuit to suitable values. Thus, when the quantity of refrigerant either in the general cooling circuit or in the cold radiating circuit becomes too large or too small, it can be readily adjusted to a suitable value.

In the system, the quantity of refrigerant varies with the operating modes, and therefore the liquid receiver is provided at the outlet of the condenser to temporarily receive the refrigerant and discharge it. This will effectively deal with the difference in the quantity of refrigerant between the operating modes, and is considerably effective in designing the system.

The system further comprises: another bypass circuit which is extended from the bottom of the accumulator in the cold radiating circuit through the gas pipe to the general cooling circuit. The oil is allowed to flow from the cold radiating circuit through the bypass circuit to the general cooling circuit for a predetermined period of time from the start of the heat storing operation. This eliminates the difficulty that the oil concentrates between the compressor and the refrigerant gas pump, and the compressor bearing is seized because the oil is used up.

Furthermore, in the system, the fins of the evaporators in the general cooling circuit and the cold radiating circuit are combined together, to provide the single heat exchanger Therefore, in the case where one of the circuits is operated, it can use the fins of the other circuit which is not in operation; that is, the heat exchange capacity is increased as much. Thus, a heat exchanger high in usability can be obtained according to the invention.

Moreover in the heat storage type air conditioning system of the invention, the load detecting means detects a cooling load to the air in a room in a cooling operation. When the cooling load is low, only the cold radiating operation utilizing the stored cold is carried out; whereas, when the cooling load is high, in addition to the cold radiating operation the general cooling operation is carried out; that is, both the cold radiating operation and the general cooling operation are performed in a parallel mode. Therefore, the degree of dependence on the stored cold by the cold radiating operation is higher than in the case of the conventional heat storage type air conditioning system; that is, the system of the invention is higher in energy-saving effect.

In the case when the ice detecting means detects a piece of ice in the heat storing tank immediately before the start of the cold storing operation, the cold storing operation is not carried out until the next cold radiating operation is started. This will prevent the cold storing heat exchanger from being damaged by the ice.

The operation ratio outputting means operates to output a ratio in time of a general cooling operation to a day's cooling operation, and the time of operation of the cold storing circuit is increased when the ratio thus outputted is large; whereas it is decreased when small.

That is, the time period of the cold storing operation at nighttime; that is, the amount of cold stored at nighttime is changed according to the ratio in time of the general cooling operation to the total cooling operation during the daytime.

Thus, in the heat storage type air conditioning system of the invention, unlike the conventional system in which there are only two kinds of cold storing time; i.e., a 100% cold storing time, and 0% cold storing time, the degree of dependence on the storage of cold is substantially prevented from fluctuating every day; that is, it is standardized.

What is claimed is:

1. A heat storage type air conditioning system comprising:
    a general cooling circuit including a compressor, a condenser, a first pressure reducing mechanism, and a first evaporator which are connected in the stated order, said general cooling circuit performing a cooling operation with the aid of said first evaporator;
    a cold radiating circuit including a refrigerant gas pump, a cold storing heat exchanger, a second pressure reducing mechanism, and a second evaporator which are connected in the stated order, said cold radiating circuit performing a cooling operation with the aid of said second evaporator;
    a heat storing tank containing a heat storing medium for storing cold with the aid of said heat storing heat exchanger;
    a first bypass circuit having a first valve unit connected between a first gas pipe in said general cooling circuit and a second gas pipe in said cold radiating circuit, said first valve unit being controlled for movement of refrigerant; and
    a second bypass circuit having a second valve unit connected between a first liquid pipe which is connected between said first pressure reducing mechanism and said first evaporator and a second liquid pipe which is connected between said second pressure reducing mechanism and said second evaporator, said second valve unit being controlled for movement of refrigerant;
    wherein, in operation of said general cooling circuit, and said cold radiating circuit which performs a cooling operation by utilizing cold energy stored in said heat storing tank, said first and second valve units of said first and second bypass circuits are closed, so that said general cooling circuit and said cold radiating circuit are operated independently of each other, and in a cold storing operation for said heat storing tank, said first and second valve units of said first and second bypass circuits are opened, to form a cold storing circuit including said compressor, condenser, first pressure reducing, and cold storing heat exchanger.

2. A heat storage type air conditioning system as claimed in claim 1 further comprising:
    a third bypass circuit for bypassing said second pressure reducing mechanism with the aid of a check valve;
    a fourth bypass circuit for bypassing with the aid of a fourth valve unit said refrigerant gas pump connected to said second gas pipe in said cold radiating circuit; and
    fifth and sixth valve units connected to the refrigerant inlets of said first and second evaporators, respectively;
    wherein said cold storing circuit is formed by closing said fifth and sixth valve units connected to the refrigerant inlets of said first and second evaporators and by communicating said first through fourth bypass circuits.

3. A heat storage type air conditioning system as claimed in claim 1 further comprising:
    refrigerant flow control means which, in operating said general cooling circuit and said cold radiating circuit simultaneously or separately, opens, upon start of said compressor or refrigerant gas pump, at least one of said first and second valve units in said first and second bypass circuits, to allow refrigerant to flow between said general cooling circuit and said cold radiating circuit, detects a degree of over-cooling of refrigerant on the side of the refrigerant outlet of said cold storing heat exchanger, or on the side of the refrigerant outlet of said condenser, or a degree of over-heating of refrigerant at said first or second evaporator, and closes said first and second valve units when said degree of over-cooling or over-heating of refrigerant thus detected reaches a predetermined value.

4. A heat storage type air conditioning system as claimed in claim 1 further comprising:

a fifth bypass circuit which branches from the outlet of said condenser for bypassing said first pressure reducing mechanism, said fifth bypass circuit including a liquid receiver, a third pressure reducing mechanism, and a seventh valve unit which are connected in the stated order.

5. A heat storage type air conditioning system as claimed in claim 2 further comprising:

a sixth bypass circuit extended from the lower end of an accumulator connected to the inlet of said refrigerant gas pump, through a eighth valve unit, to a gas pipe between said first bypass circuit and said fourth bypass circuit, said valve unit being opened for a predetermined period of time from the start of a heat storing operation of storing cold in said heat storing tank.

6. A heat storage type air conditioning system as claimed in claim 1, wherein fins of said first and second evaporators are combined together, to form a single heat exchanger the heat exchange capacity of which is large enough for both said general cooling circuit and said cold radiating circuit.

7. A heat storage type air conditioning system as claimed in claim 2, said system further comprising:

load detecting means for detecting an amount of cooling load; and cooling circuit controlling means which operates said cold radiating circuit when said amount of cooling load thus detected is low, and operates said general cooling circuit when said amount of cooling load is high.

8. A heat storage type air conditioning system as claimed in claim 2, said system further comprising:

ice detecting means for detecting the presence or absence of a piece of ice in said heat storing tank; and cold storing circuit controlling means for suspending the operation of said cold storing circuit when a piece of ice piece is detected by said ice detecting means.

9. A heat storage type air conditioning system as claimed in claim 2, said system further comprising:

operation ratio outputting means for outputting a ratio in time period of a general cooling operation to a total cooling operation in a day; and cold storing time period controlling means for controlling the time period of operation of said cold storing circuit according to said ratio thus outputted.

* * * * *